3,119,817
3-AMINOSTEROIDS
John S. Tadanier, Chicago, and John Wayne Cole, Deerfield, Ill., assignors to Abbott Laboratories, North Chicago, Ill., a corporation of Illinois
No Drawing. Filed Mar. 16, 1962, Ser. No. 180,356
9 Claims. (Cl. 260—239.55)

The present application is directed to a new steroid intermediate which is useful in the manufacture of physiologically active steroids. More particularly, this invention is directed to the manufacture of 3-amino-17-alkylenedioxyandrost-5-enes of the formula:

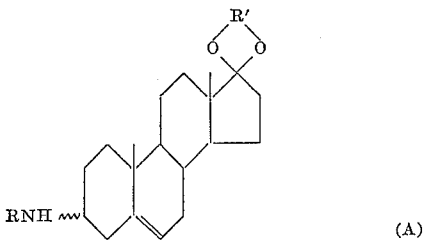

(A)

wherein R is hydrogen or an acyl group containing 2 to 7 carbon atoms, and wherein R' is an alkylene radical in which the valence bonds are separated by 2-3 carbon atoms. Preferably, R' is 1,2-ethylene, 1,3-propylene, 1,2-propylene, 2,3-butylene or 2,2-dimethyl-1,3-propylene. The 3-substituent which may be in the α or β position is an amino group wherein one hydrogen may be substituted by acetyl, propionyl, isobutyryl, benzoyl, cyclohexanecarbonyl, or a similar acyl group.

The starting material for the manufacture of the new compounds (A) of this invention are compounds of the formula:

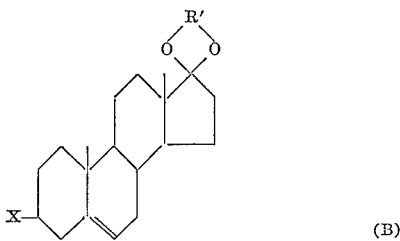

(B)

wherein X is a sulfonic ester radical of the formula R"SO$_3$ wherein R" is alkyl or aryl, and wherein R' is an alkylene group as defined above.

The compounds of the Formula A are made by heating a compound of Formula B in the presence of excess ammonia for several hours to elevated temperatures under pressure. After cooling, the excess ammonia is stripped and the residue is shaken with ether and aqueous alkali hydroxide, whereupon the new compounds are isolated from the organic layer.

The specific new compounds of Formula A can all be made according to the above general outline. Their specific preparation is better understood by reference to the following examples which are given here as illustrations only but which are not intended to limit the invention in any respect.

EXAMPLE 1

3β-Amino-17-Ethylenedioxyandrost-5-Ene

A mixture of 15 g. of 3β-p-toluenesulfonoxy-17-ethylenedioxyandrost-5-ene, described in Bull. Soc. Chim. France (1960) page 298, and 60 ml. of liquid ammonia in a pressure vessel is slowly warmed to 100° C. and held at this temperature for 15 hours. The mixture is cooled and the excess ammonia is allowed to evaporate. The residue is transferred into a separatory funnel with 300 ml. of ether and is shaken with 200 ml. of 5% aqueous sodium hydroxide. The layers are separated and the aqueous layer is washed with an additional portion of 200 ml. of ether. The ether solutions are combined, washed with water, and dried over magnesium sulfate. The ether solution is then evaporated to yield 9.4 g. of crude products.

The crude material is dissolved in a solution prepared from 30 ml. of methanol and 3 ml. of acetic acid. This solution is shaken with 300 ml. of ether and 200 ml. of water. The aqueous layer is separated and washed with 300 ml. of ether. The ether solutions are washed in series with three 100-ml. portions of water which are combined with the original aqueous extract. The resulting aqueous solution containing the acetic acid salts of the amines is shaken with 300 ml. of ether and 200 ml. of 5% aqueous sodium hydroxide. After separating the layers, the organic layer is washed with water, dried, and the ether is evaporated to leave 6.9 g. of a crystalline product. Recrystallization of this material from pentane produces a first crop of 2.4 g. of 6β-amino-17-ethylenedioxy-3α,5α-cycloandrostane.

The filtrate is concentrated and the residue is dissolved in 20 ml. of acetic acid/methanol (1:10). The white crystals are separated on a filter and washed with two 4-ml. portions of methanol, leaving about 1 g. of the acetic acid salt of 3β-amino-17-ethylenedioxyandrost-5-ene. The filtrate is set aside and used as described below in Example 2. Purification of the acetic acid salt by recrystallization from methanol produces crystals melting at 218–25° C. with an $[\alpha]_D^{23}$ of 64° in methanol.

The free amine is obtained by shaking the acetic acid salt with 5% aqueous sodium hydroxide and ether, followed by separating the organic layer, washing it with a small amount af water, and drying over magnesium sulfate. Evaporation of the ether yields 3β-amino-17-ethylenedioxyandrost-5-ene as a crystalline residue.

EXAMPLE 2

3α-Amino-17-Ethylenedioxyandrost-5-Ene

The filtrate obtained in Example 1 by separation of the acetic acid salt of 3β-amino-17-ethylenedioxyandrost-5-ene is shaken with 400 ml. of 5% sodium bicarbonate solution and 400 ml. of ether. The aqueous phase is separated and the ether solution is filtered through a sintered glass funnel to remove a small amount of insoluble white solid. The alkaline aqueous phase is extracted with 300 ml. of ether. The two ether solutions are washed in series with three 250-ml. portions of water, combined, and dried over magnesium sulfate. The ether is evaporated leaving 3.1 g. of an orange solid. Recrystallization of this material from pentane using decolorizing carbon yields a second crop of 1.1 g. of 6β-amino-17-ethylenedioxy-3α,5α-cycloandrostane.

The filtrate from the separation of the second crop of 6β-amino-17-ethylenedioxy-3α,5α-cycloandrostane is diluted with an equal volume of ether (about 10 ml.) and 0.5 ml. of glacial acetic acid is added. On standing, the solution deposits 0.7 g. of the acetic acid salt of 3α-amino-17-ethylenedioxyandrost-5-ene as white needles. The salt melts at about 125°.

The free amine is obtained by shaking the above salt with 5% aqueous sodium carbonate and ether, followed by separating the ether layer, washing it with a small amount of water, and evaporating the ether. A crystalline residue of 3α-amino-17-ethylenedioxyandrost-5-ene is obtained, which is recrystallized from ether/pentane. The crystals melt at 146–48° C. and show an $[\alpha]_D^{23}$ of −88° in chloroform. The analytical values correspond to those calculated for the compound of the empirical formula $C_{21}H_{33}NO_2$.

EXAMPLE 3

*3β-Acetamido-17-Ethylenedioxyandrost-5-Ene*

To a mixture of 205 mg. of the acetic acid salt of 3β-amino-17-ethylenedioxyandrost-5-ene from Example 1 in 5 ml. of pyridine is added 1.0 ml. of acetic anhydride. The resulting solution is kept at room temperature for 16 hours and then shaken with 50 ml. of water and 50 ml. of chloroform. The chloroform layer is separated, washed with water, dried over magnesium sulfate, and concentrated in vacuo, yielding a crystalline residue of 196 mg. of 3β-acetamido-17-ethylenedioxyandrost-5-ene, M.P. 215–218°. A portion of this residue is crystallized by dissolving it in benzene, adding Skellysolve B (a petroleum ether fraction boiling from 60°–80° C.), concentrating this solution and adding more Skellysolve B, to give an analytical sample melting at 216–219° C. Infrared absorption and other analytical data confirm the structure and empirical formula $C_{23}H_{35}O_3N$.

EXAMPLE 4

*3β-Propionamido-17-Ethylenedioxyandrost-5-Ene*

By repeating the procedure of Example 3, but replacing the acetic anhydride used therein with 1.3 ml. of propionic anhydride, 3β-propionamido-17-ethylenedioxyandrost-5-ene is obtained, of which the values of an analytical sample conform with the empirical formula $C_{24}H_{37}O_3N$.

EXAMPLE 5

*3α-Acetamido-17-Ethylenedioxyandrost-5-Ene*

By using 205 mg. of 3α-amino-17-ethylenedioxyandrost-5-ene acetic acid salt in place of the acetic salt of the 3β-isomer in Example 3, and following the procedure given in Example 3, 3α-acetamido-17-ethylenedioxyandrost-5-ene is obtained. The analytical values of a recrystallized sample correspond with the empirical formula $C_{23}H_{35}O_3N$.

EXAMPLE 6

*3α-Amino-17-(1,3-Propylenedioxy)Androst-5-Ene and 3β-Amino-17-(1,3-Propylenedioxy)Androst-5-Ene*

3β-hydroxy-17-(1,3-propylenedioxy)-androst-5-ene is prepared by treatment of 3β-hydroxyandrost-5-en-17-one with 1,3-propanediol in the presence of p-toluenesulfonic acid, following the general procedure for making such a propylenedioxy derivative of U.S. 2,302,636. The reaction product is subsequently mixed with p-toluenesulfonyl chloride and pyridine at room temperature in the well-known manner to produce 3β-p-toluenesulfonoxy-17-(1,3-propylenedioxy)androst-5-ene.

By following the procedure of Example 1, but replacing 3β-p-toluenesulfonoxy-17-ethylenedioxy-5-androst-5-ene with 3β-p-toluenesulfonoxy-17-(1,3-propylenedioxy)-androst-5-ene, 3β-amino-17-(1,3-propylenedioxy)androst-5-ene and 3α-amino-17-(1,3-propylenedioxy)androst-5-ene are obtained. These amines are isolated by fractionated crystallization as the acetic acid salts. The free amines are prepared from the acetic acid salts by the procedures illustrated in Examples 1 and 2. The 3β-amine is liberated by treatment of the acetic acid salt with 5% aqueous sodium hydroxide solution, while for the 3α-amine 5% aqueous sodium carbonate solution is employed.

These amines are characterized by their infrared absorption patterns and by their analytical values which correspond to the empirical formula $C_{22}H_{35}O_2N$.

EXAMPLE 7

*3β-Benzamido-17-Ethylenedioxyandrost-5-Ene*

By following the procedure described in Example 3, but replacing the acetic anhydride used therein with 1.4 g. of benzoylchloride, 3β-benzamido-17-ethylenedioxyandrost-5-ene is obtained, of which the analytical values obtained correspond to the values calculated for the empirical formula $C_{28}H_{37}O_3N$.

EXAMPLE 8

*3α-Benzamido-17-Ethylenedioxyandrost-5-Ene*

In analogy to Example 7, 3α-benzamido-17-ethylenedioxyandrost-5-ene is made by replacing the 3β-amino compound used therein with the corresponding 3α-aminosteroid.

EXAMPLES 9–25

In the manner shown in the above examples, the following tabulated 3,17-substituted androst-5-enes are prepared from compounds of Formula B:

| Ex. No. | 3-substituent | 17-substituent |
| --- | --- | --- |
| 9 | α- or β-butyramido- | ethylenedioxy. |
| 10 | α- or β-hexanamido- | Do. |
| 11 | α- or β-cyclohexanecarbamido- | Do. |
| 12 | α- or β-acetamido- | 1,2-propylenedioxy. |
| 13 | α- or β-amino- | Do. |
| 14 | α- or β-propionamido- | Do. |
| 15 | α- or β-benzamido- | Do. |
| 16 | α- or β-hexanamido- | 1,3-propylenedioxy. |
| 17 | α- or β-acetamido- | Do. |
| 18 | α- or β-butyramido- | Do. |
| 19 | α- or β-acetamido- | 2,3-butylenedioxy. |
| 20 | α- or β-benzamido- | Do. |
| 21 | α- or β-amino- | Do. |
| 22 | α- or β-acetamido- | 2,2-dimethyl-1,3-propylenedioxy. |
| 23 | α- or β-propionamido- | Do. |
| 24 | α- or β-butyramido- | Do. |
| 25 | α- or β-cyclohexanecarbamido- | Do. |

Similar 3-aminoandrost-5-enes carrying in the 17-position a ketal structure of the aforementioned class can be made in accordance with the above examples. Substitution in the 3α- or 3β-amino nitrogen with other carbonyl groups according to the preceding detailed examples will yield similar steroid ketals within the definition of Formula (A).

The 3-acylaminosteriods of Formula A are important intermediates in the preparation of known steriods of valuable physiological activities. Thus, the 3-acylamino compounds of Formula A can be reacted by known methods to modify the group in the 17-position while the amino-group in the 3-position remains protected. The acyl-group can then be removed or can be retained as protection for the amino-group for further modification within the molecules. Among the known aminosteroids that can be made from the 3-acylamino compounds of Formula A are funtumidine, a cardiotonic agent described by La Barre et al. in Arch. Int. Pharmacodyn 119, 514–16 (1959) and Janot et al. in Compt. Rend. Acad. Sci. 246, 3076 (1958), wherein the 3-amino-group is in the α-position, and holaphylline described by Janot et al in Bull. Soc. Chim. Fr., (1959) 896, by methylation and changing the ketal-group in the 17-position by known methods from the 3β-acylaminosteroid.

The 3-amino compounds of Formula A also are valuable intermediates for the preparation of known steriods with hormonal activities. Thus, such an aminosteroid can be deaminated with sodium nitrite to yield after hydrolysis the well-known metabolite and androgen androstenolone described by Fieser & Fieser's Steroids (Reinhold, New York, 1959, page 507), or isomers of said androstenolone.

The 3-aminosteroids of Formula A can be acylated by acid chlorides or acid anhydrides in pyridine or by the Schotten-Baumen procedure (Fieser, Experiments in Organic Chemistry Part II, page 398, 2nd ed., 1941, Heath & Co., New York), and the 3-acylamino products can be hydrolyzed by aqueous alkali to obtain the 3-amino compounds. Both of these conversions can be made without damaging the double bond in the 5-position or the acetal grouping in the 17-position.

Others may practice the invention in any of the numerous ways which will be suggested to one skilled in the art by the present disclosure. All such practice of the invention is considered to be a part hereof provided it falls within the scope of the appended claims.

We claim:
1. A steroid of the formula:

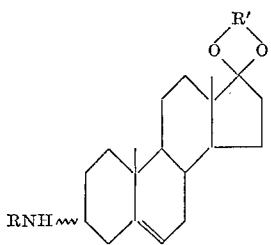

wherein R is selected from the group consisting of hydrogen and acyl having from 2 to 7 carbon atoms and wherein R' is an alkylene radical in which the valence bonds are separated by 2 to 3 carbon atoms.
2. 3α-amino-17-ethylenedioxyandrost-5-ene.
3. 3β-amino-17-ethylenedioxyandrost-5-ene.
4. 3α-acetamido-17-ethylenedioxyandrost-5-ene.
5. 3β-acetamido-17-ethylenedioxyandrost-5-ene.
6. 3α-benzamido-17-ethylenedioxyandrost-5-ene.
7. 3β-benzamido-17-ethylenedioxyandrost-5-ene.
8. 3β-propionamido-17-ethylenedioxyandrost-5-ene.
9. The process of preparing 3-amino-17-alkylenedioxyandrost-5-enes comprising
the step of treating a 17-alkylenedioxyandrost-5-ene, carrying in the 3-position a sulfonic ester radical of the formula $RSO_3$ wherein R is a hydrocarbon selected from the group consisting of alkyl and aryl, with excess ammonia, at elevated temperature and under pressure.

References Cited in the file of this patent
UNITED STATES PATENTS

| | | |
|---|---|---|
| 2,225,419 | Logemann et al. | Dec. 17, 1940 |
| 2,430,467 | Julian et al. | Nov. 11, 1947 |

OTHER REFERENCES
Iriarte et al.: J. Org. Chem. 20, #4, pages 542–45.